United States Patent
Furuta et al.

(10) Patent No.: US 7,963,047 B2
(45) Date of Patent: Jun. 21, 2011

(54) BRAKING DEVICE OF MEASURING INSTRUMENT AND MEASURING INSTRUMENT

(75) Inventors: Makoto Furuta, Nakatsugawa (JP); Kouichi Adachi, Nakatsugawa (JP)

(73) Assignee: Mitutoyo Corporation, Kawasaki-shi (JP)

( * ) Notice: Subject to any disclaimer, the term of this patent is extended or adjusted under 35 U.S.C. 154(b) by 192 days.

(21) Appl. No.: 12/481,232

(22) Filed: Jun. 9, 2009

(65) Prior Publication Data
US 2009/0308699 A1   Dec. 17, 2009

(30) Foreign Application Priority Data
Jun. 11, 2008   (JP) .................................. 2008-152804

(51) Int. Cl.
*G01B 3/22*   (2006.01)
*G01B 21/02*   (2006.01)
(52) U.S. Cl. ........................... 33/832; 33/556; 33/DIG. 6
(58) Field of Classification Search ............ 33/832–838, 33/501, 501.05, 501.08, 501.6, 542, 542.1, 33/544.2, 556, 558, 559, 561, DIG. 6
See application file for complete search history.

(56) References Cited

U.S. PATENT DOCUMENTS

| | | | | |
|---|---|---|---|---|
| 1,433,076 A | * | 10/1922 | Green | 33/556 |
| 2,663,945 A | * | 12/1953 | Emery | 33/556 |
| 2,832,151 A | * | 4/1958 | Emery | 33/556 |
| 3,216,118 A | * | 11/1965 | Pistoles | 33/558 |
| 4,385,446 A | | 5/1983 | Roch et al. | |
| 4,566,201 A | | 1/1986 | Ishii | |
| 5,473,822 A | * | 12/1995 | Struble | 33/559 |

FOREIGN PATENT DOCUMENTS

| | | |
|---|---|---|
| DE | 1 005 744 B | 4/1957 |
| FR | 2 554 921 | 5/1985 |
| JP | 59-170701 | 9/1984 |
| JP | 2006177681 A * | 7/2006 |

* cited by examiner

*Primary Examiner* — Amy Cohen Johnson
(74) *Attorney, Agent, or Firm* — Rankin, Hill & Clark LLP (57) ABSTRACT

A braking device of a measuring instrument includes a body case and a spindle that penetrates the body case to be axially and reciprocably displaceable. The braking device includes a cylinder of which a first end is attached to the body case for accommodating a second end of the spindle, a piston provided on the second end of the spindle and accommodated to be reciprocably displaceable within the cylinder, a closing member provided on a second end of the cylinder to form a damper chamber between the closing member and the piston; a shaft connected to a side of the piston opposite to the spindle and penetrates the closing member; and a knob provided on a distal end of the shaft. A clearance is provided between the closing member and the shaft to circulate air.

5 Claims, 10 Drawing Sheets

BRAKING DEVICE OF MEASURING INSTRUMENT AND MEASURING INSTRUMENT

BACKGROUND OF THE INVENTION

1. Field of the Invention

The present invention relates to a braking device of a measuring instrument and the measuring instrument. More particularly, the present invention relates to a braking device of a spindle that is axially and reciprocably displaceable relative to a case body, and a measuring instrument including the braking device.

2. Description of Related Art

There has been known a dial gauge (mechanical type, digital type) as a measuring instrument that measures a dimension or the like of an object based on a displacement of a spindle that is axially and reciprocably displaceable relative to a case body by bringing a distal end (probe) of the spindle into contact with the object.

In the dial gauge, the distal end of the spindle is biased to project from the case body by a biasing unit. Accordingly, the spindle may vigorously collide with the object by suddenly moving down due to the biasing force. Thus, a braking device has been suggested in which a spindle is prevented from colliding with an object to be measured by braking a sudden movement of the spindle (for instance, see Document 1: JP-A-59-170701).

Figure 10:
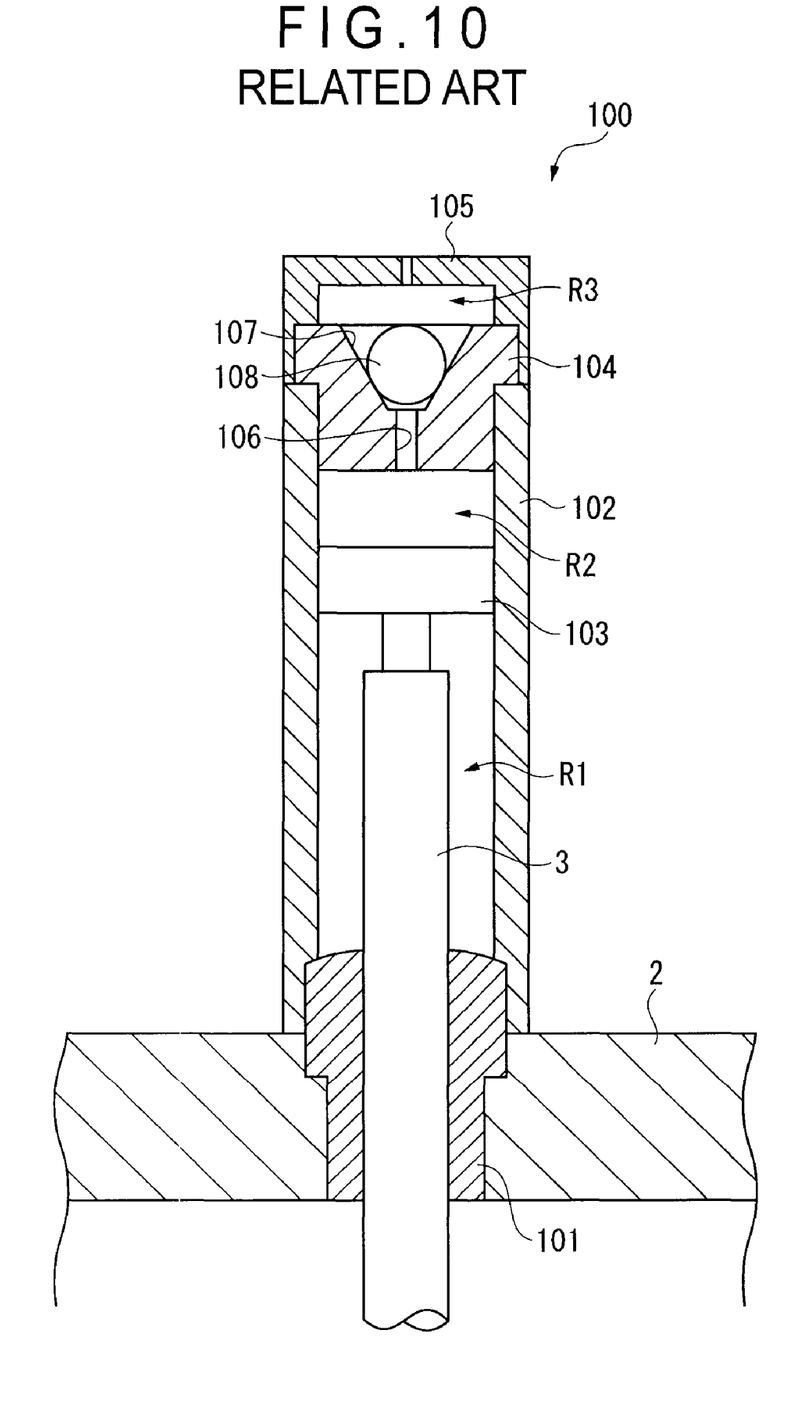
FIG. 10 shows a traditional braking device of a spindle.

FIG. 10 shows a traditional braking device of a spindle. A braking device 100 includes: a bush 101 for guiding a second end of a spindle 3 that penetrates a case body 2 and has a probe (not shown) on a first end; a cylinder 102 of which a first end is externally fitted to the bush 101 for accommodating the second end of the spindle 3; a piston 103 provided on the second end of the spindle 3 to define a first chamber R1 between the piston 103 and the bush 101; and a partition 104 fitted to a second end of the cylinder 102 to define a second chamber R2 between the partition 104 and the piston 103.

The spindle 3 is biased downwardly (toward the lower side in FIG. 10) by a biasing unit (not shown).

The piston 103 has an outer diameter that is slightly smaller than an inner diameter of the cylinder 102, so that a clearance having an appropriate size sufficient for a fluid to flow is provided between an outer circumference of the piston 103 and an inner circumference of the cylinder 102.

A cap 105 is fitted to the partition 104 to define a valve chamber R3 therebetween, while a through hole 106 is provided on the partition 104 to communicate between the second chamber R2 and the valve chamber R3. A conical valve seat 107 is provided on the through hole 106 to accommodate a ball 108.

When the spindle 3 is moved down, the volume of the first chamber R1 is reduced and the volume of the second chamber R2 is expanded by the piston 103 that is moved down in conjunction with the spindle 3. Accordingly, the pressure in the first chamber R1 is increased while the pressure in the second chamber R2 is decreased. Thus, the piston 103 is braked, whereby a damper effect can be obtained (i.e., a force against a biasing force or the like of the biasing unit applied on the spindle 3 is applied on the spindle 3). Consequently, the descent of the spindle 3 can be braked. Incidentally, when the dial gauge is laid sideways, the ball 108 is slipped from the valve seat 107 to open the through hole 106. Accordingly, the braking force can be weakened corresponding to decrease in a component of gravity axially applied on the spindle 3 and the piston 103

However, in the braking device 100 disclosed in Document 1, it is required that the first chamber R1 and the second chamber R2 that are hermetically sealed are provided above the body case 2 into which the upper end of the spindle 3 is inserted. Thus, a lifting mechanism for the spindle 3, i.e., a lifting mechanism for lifting the spindle 3 for measurement, cannot be provided.

SUMMARY OF THE INVENTION

An object of the invention is to provide a braking device including a lifting mechanism for a spindle and a measuring instrument including the braking device.

According to an aspect of the invention, a braking device of a measuring instrument which comprises a body case and a spindle that penetrates the body case to be axially and reciprocably displaceable and includes a probe at a first end, includes: a cylinder of which a first end is attached to the body case for accommodating a second end of the spindle; a piston provided on the second end of the spindle and accommodated to be reciprocably displaceable within the cylinder; a closing member provided on a second end of the cylinder to form a damper chamber between the piston and the closing member; a shaft that is opposite to the spindle by interposing the piston therebetween and penetrates the closing member; and an operating section provided on a distal end of the shaft, wherein a clearance is provided between the closing member and the shaft for circulating air between the damper chamber and an outside.

According to the aspect of the invention, when the spindle is moved toward the first end (i.e., the side provided with the probe), the piston is also moved toward the first end in conjunction with the spindle. Accordingly, the volume of the damper chamber is expanded and the pressure of the damper chamber is reduced, thereby braking the movement of the spindle.

Since the clearance is provided between the closing member forming the damper chamber and the shaft connected to the piston, air is gradually delivered into the damper chamber through the clearance, thereby moving the spindle while braking the movement of the spindle. In other words, a damper effect can be obtained.

When the shaft is moved toward the second end by the operating section after the spindle is moved toward the first end, the piston and the spindle that are connected to the shaft are also moved toward the second end.

When the piston is moved toward the second end, the volume of the damper chamber is reduced and the pressure in the damper chamber is increased. Accordingly, air within the damper chamber is discharged through the clearance between the closing member and the shaft connected to the piston, thereby moving the spindle toward the second end.

Thus, the braking device can include a lifting mechanism for the spindle.

In the braking device of the measuring instrument according to the aspect of the invention, the closing member may be displaceable in an axial direction of the shaft and contactable to a second end surface of the cylinder.

According to such an arrangement, when the shaft is moved toward the second end by the operating section, the volume of the damper chamber is reduced and the pressure of the damper chamber is increased. Accordingly, the closing member is displaced in the axial direction of the shaft by the pressure of the damper chamber to be spaced apart from the second end surface of the cylinder. Consequently, a large clearance is provided between the closing member and the second end surface of the cylinder, whereby the air within the damper chamber is discharged through this clearance to the outside. Thus, the damper effect cannot be produced and therefore the spindle can be lifted by a small force.

In the braking device of the measuring instrument according to the aspect of the invention, a cap may be provided on the second end of the cylinder to cover the closing member and prevent the closing member from being displaced beyond a predetermined distance in the axial direction of the shaft.

According to such an arrangement, the cap prevents the closing member from being displaced beyond a predetermined distance in the axial direction of the shaft. Thus, the shaft is not significantly displaced in the axial direction of the shaft while the spindle is lifted. Consequently, when the spindle is moved toward the first end for the next measurement, for instance, the closing member can be promptly brought into contact with the second end surface of the cylinder, thereby readily exhibiting the damper effect.

In the braking device of the measuring instrument according to the aspect of the invention, the shaft may be detachable from the piston, and a circulating hole may be provided on the piston or on both of the piston and the spindle to communicate between the damper chamber and a chamber opposite to the damper chamber by interposing the piston therebetween for circulating air.

According to such an arrangement, by removing the shaft from the piston and covering the second end of the cylinder with a cover cap or the like, the braking device can be used without the lifting mechanism. In other words, since the circulating hole is provided on the piston or on both of the piston and the spindle to communicate between the damper chamber and the chamber opposite to the damper chamber by interposing the piston therebetween for circulating the air, the pressure of the damper chamber is reduced when the spindle is moved toward the first end (i.e., the side provided with the probe). Thus, the movement of the spindle is braked. At this time, air is gradually delivered into the damper chamber through the circulating hole. Thus, the spindle is moved while being braked, i.e., the damper effect can be produced.

Due to such an arrangement, by removing the cover cap and connecting the shaft including the operating section at the distal end with the piston afterward, the braking device can include the lifting mechanism.

A measuring device according to another aspect of the invention includes: a body case; a spindle that penetrates the body case to be axially and reciprocably displaceable and includes a probe at a first end; a biasing unit that biases the spindle toward the first end; and the above-described braking device.

According to such an arrangement, the above-described advantages can be attained because the braking device has the same arrangements as the above-described braking device.

The measuring instrument may be a mechanical instrument or a digital instrument. The digital measuring instrument may include a displacement detector that detects a displacement of the spindle and a display that displays the displacement detected by the displacement detector, in addition to the above-described arrangements. Incidentally, the displacement detector may be provided by a photoelectric type, electrostatic capacitance type or magnetic type encoder, and a gear mechanism. Also, the display may be provided by a liquid crystal panel.

DETAILED DESCRIPTION OF PREFERRED EMBODIMENT(S)

Exemplary embodiment(s) of the invention will be described below with reference to the attached drawings.
[Explanation of Arrangement (see FIGS. 1 to 3)]

Figure 1:
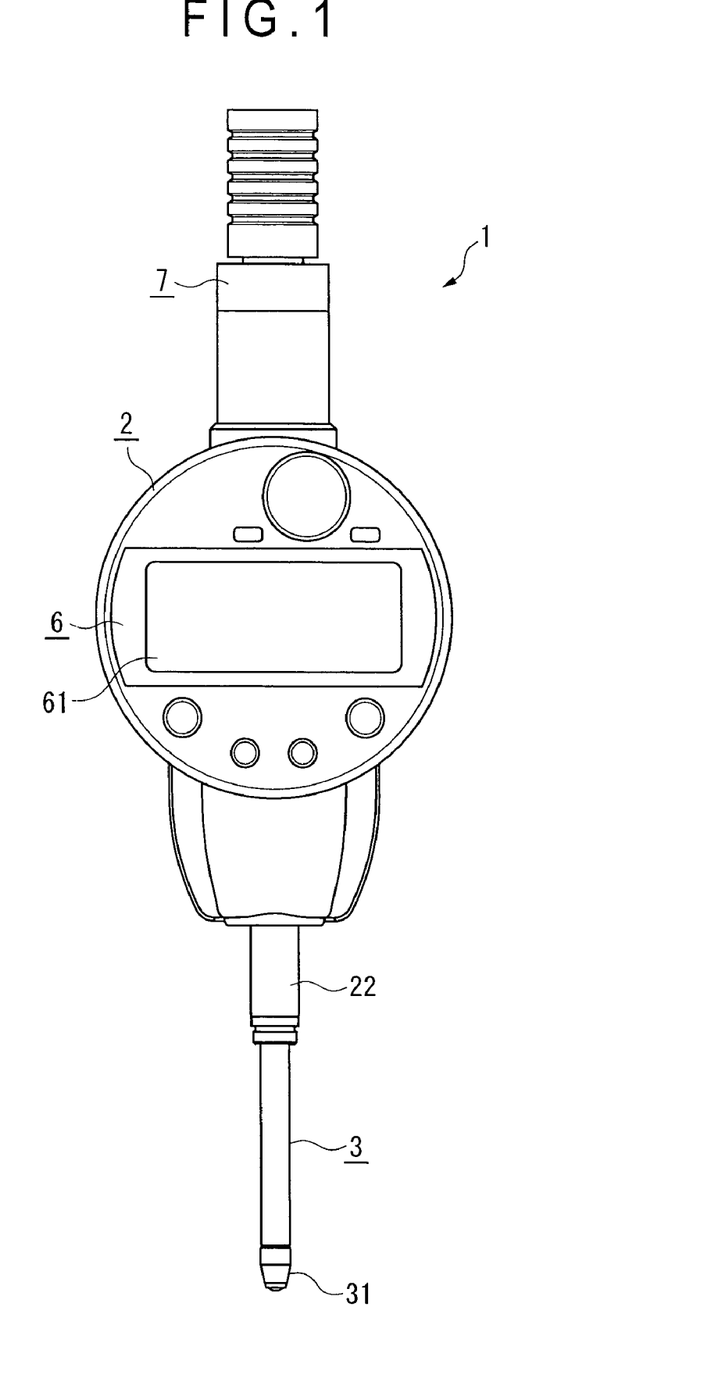
FIG. 1 is a front view showing a dial gauge according to an exemplary embodiment of the invention.
Figure 2:
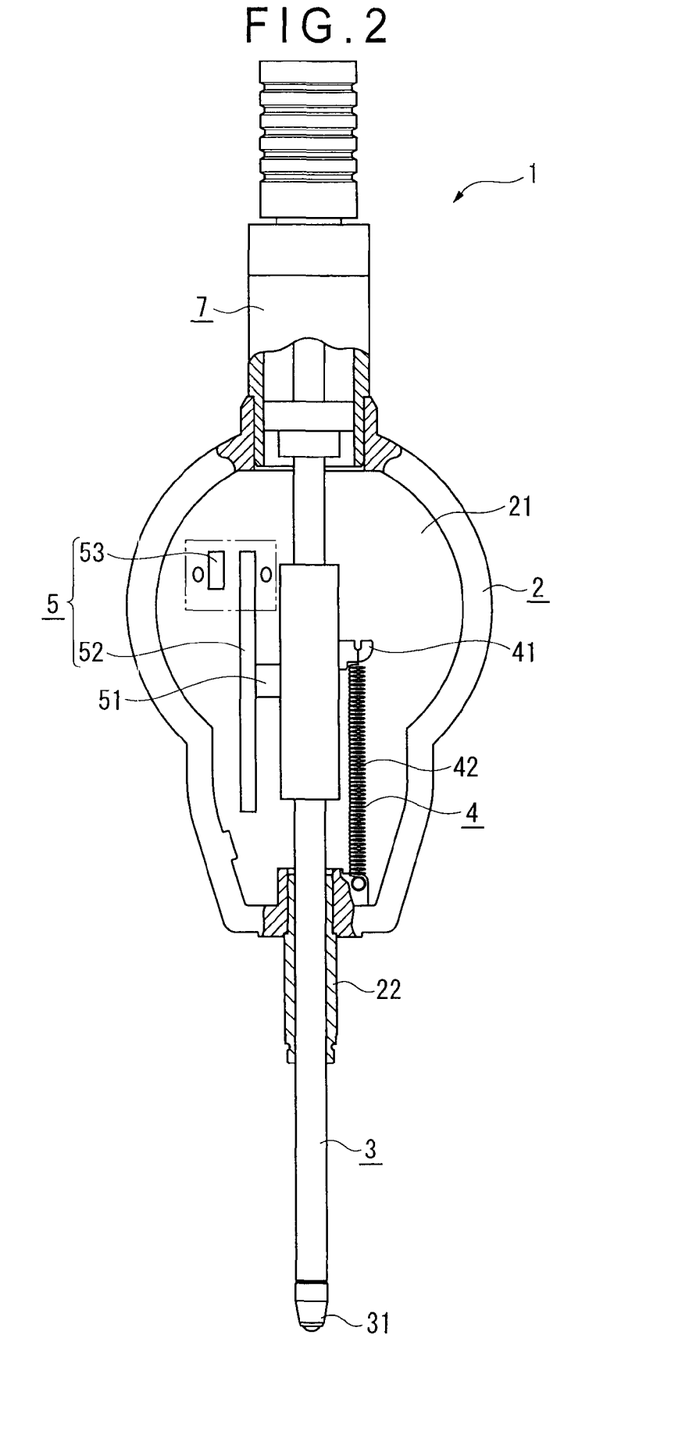
FIG. 2 shows an internal arrangement of the dial gauge according to the exemplary embodiment.

As shown in FIGS. 1 and 2, a dial gauge 1 of the exemplary embodiment includes: a body case 2; a spindle 3 that penetrates the body case 2 to be axially and reciprocably displaceable; a biasing unit 4 that axially biases the spindle 3 toward a first end (the lower end in FIG. 2); a displacement detector 5 that detects a displacement of the spindle 3; a display 6 that displays the displacement detected by the displacement detector 5; and a braking device 7 that brakes a descending speed of the spindle 3 and includes a lifting mechanism for lifting the spindle 3 toward a second end (the upper end in FIG. 2).

The body case 2 includes an accommodating space 21 therein and a stem 22 for guiding a substantially middle portion of the spindle 3 at the lower end.

The spindle 3 includes a probe 31 having a predetermined rigidity at the lower end.

The biasing unit 4 is provided by a coil spring 42 of which a lower end is fixed to the body case 2 and of which an upped end is fixed to a support piece 41 that is displaced in conjunction with the spindle 3.

The displacement detector 5 includes a scale 52 fixed to the spindle 3 via an attachment 51 to be parallel to the spindle 3; and a detecting section 53 fixed to the body case 2 being spaced apart from the scale 52 by a predetermined distance for detecting a displacement of the scale 52. The displacement detected by the displacement detector 5 is sent to the display 6.

The display 6 is provided by a liquid crystal panel 61 or the like arranged in a front middle portion of the body case 2.

Figure 3:
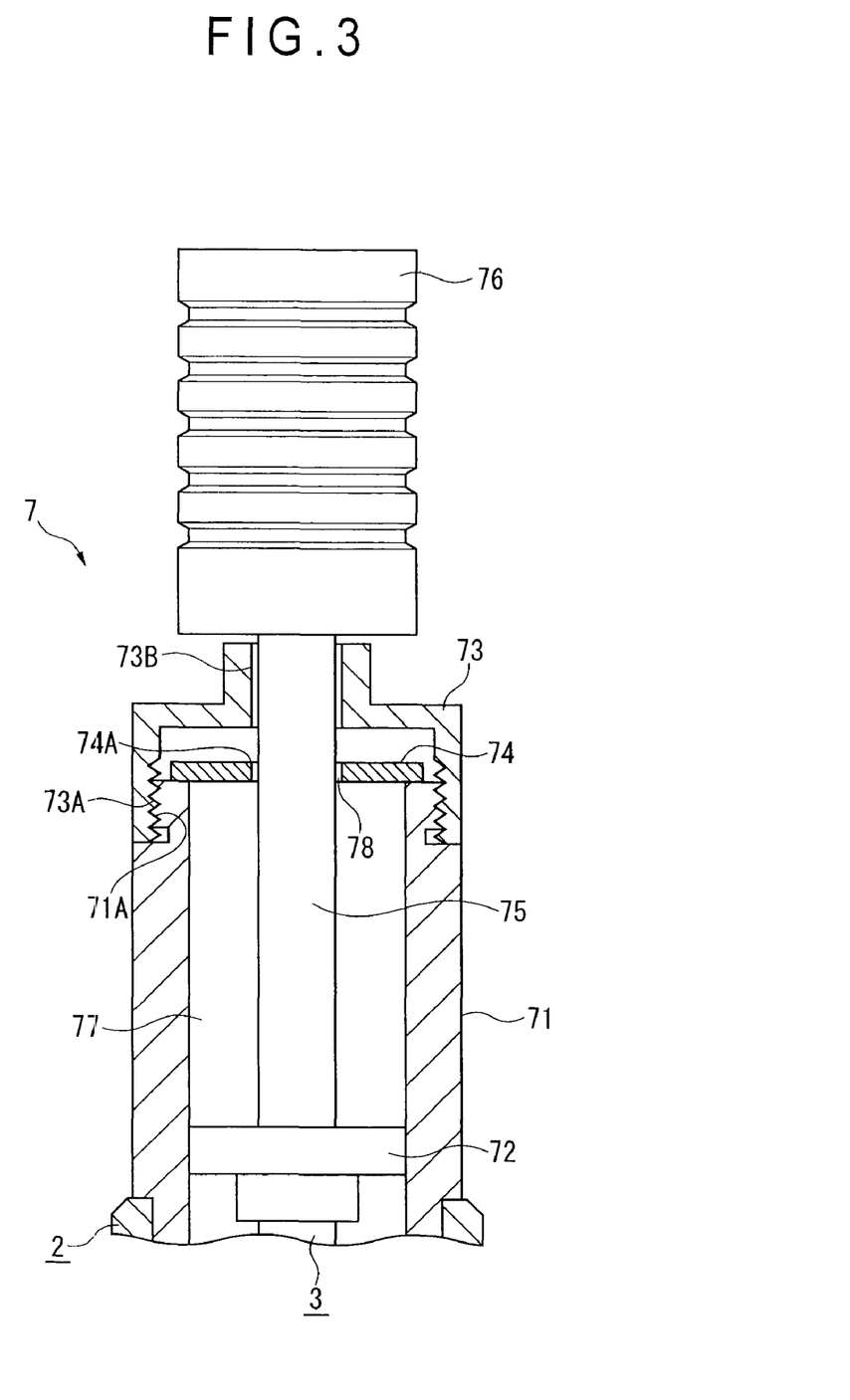
FIG. 3 is a cross sectional view showing a braking device according to the exemplary embodiment.

As shown in FIG. 3, the braking device 7 includes: a cylinder 71 of which a lower end is fitted to the upper end of the body case 2 for communicating with the accommodating space 21 of the body case 2; a piston 72 that is provided on the upper end of the spindle 3 and is reciprocably displaceable within the cylinder 71; a cap 73 detachably screwed to the upper end of the cylinder 71; a closing member 74 placed between the cap 73 and the upper end surface of the cylinder 71; a shaft 75 connected to a side of the piston 72 opposite to the spindle 3 and extends to penetrate the center of the closing member 74 and the cap 73; and a knob 76 serving as an operating section provided on the distal end (upper end) of the shaft 75.

An external thread 71A is provided on the outer circumference at the upper end of the cylinder 71.

The piston 72 is a disk, of which an outer diameter is slightly smaller than the inner diameter of the cylinder 71.

The cap 73 prevents the closing member 74 from being displaced beyond a predetermined distance in the axial direction of the shaft 75. An internal thread 73A that is screwed with the external thread 71A of the cylinder 71 is provided on the inner circumference of the cap 73, and a through hole 73B is provided at the center of the cap 73.

The closing member 74 includes a through hole 74A into which the shaft 75 is inserted. The closing member 74 is displaceable between the second end surface of the cylinder 71 and the cap 73 in the axial direction of the shaft 75, and forms a damper chamber 77 between the closing member 74 and the piston 72 when the closing member 74 is in contact with the upper end surface of the cylinder 71. A clearance 78 is provided between the through hole 74A of the closing member 74 and the shaft 75 to circulate air between the damper chamber 77 and the outside thereof. Incidentally, the closing member 74 may be made of metal or resin.

[Explanation of Operation (see FIGS. 4 to 6)]
(Braking Operation)

Figure 4:
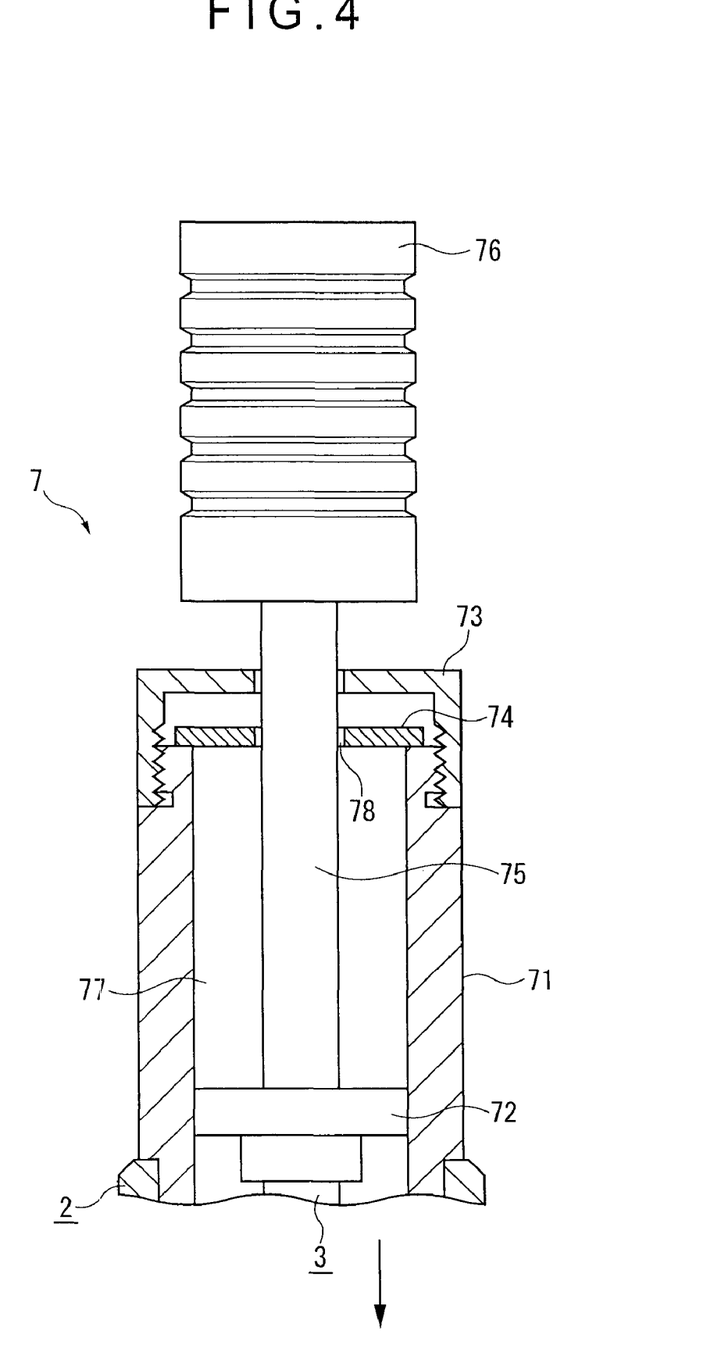
FIG. 4 is a cross sectional view showing the braking device when a spindle is moved down according to the exemplary embodiment.

As shown in FIG. 4, when the spindle 3 is moved down by the biasing force of the biasing unit 4 or the weight of the spindle 3, the piston 72 is also moved down in conjunction with the spindle 3. Accordingly, the volume of the damper chamber 77 is expanded and the pressure in the damper chamber 77 is reduced, thereby braking the movement of the spindle 3.

Since the clearance 78 is provided to circulate air between the closing member 74 defining the damper chamber 77 and the shaft 75 connected to the piston 72, the air is gradually delivered into the damper chamber 77 through the clearance 78, thereby moving the spindle 3 while braking the movement of the spindle 3. In other words, a damper effect can be obtained.

(Lifting Operation)

Figure 5:
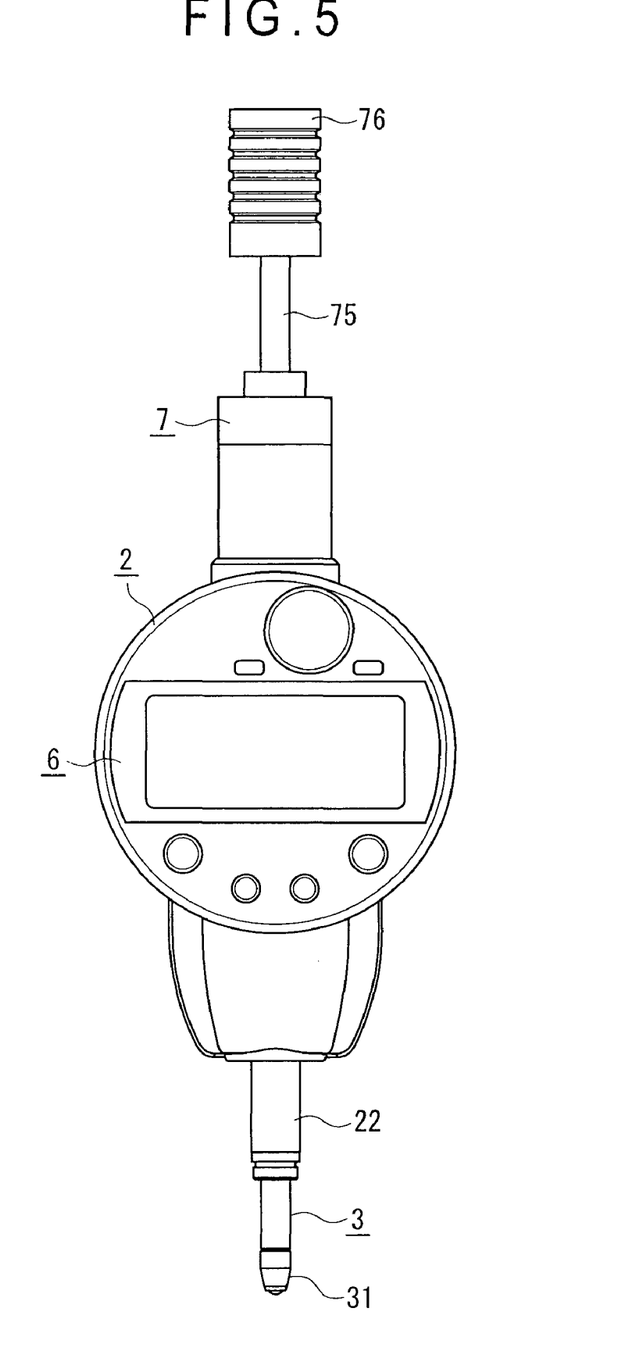
FIG. 5 is a front view showing the dial gauge when the spindle is moved up according to the exemplary embodiment.
Figure 6:
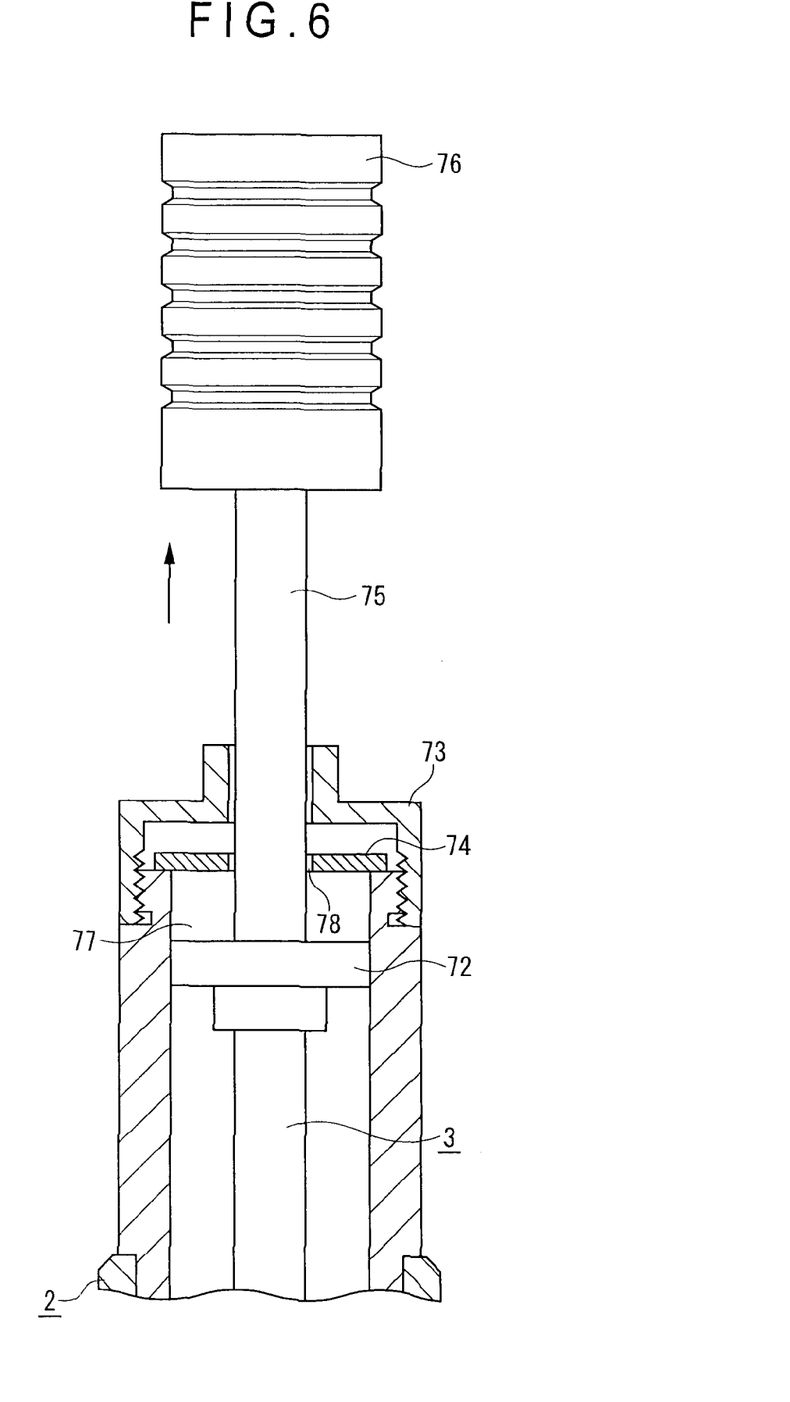
FIG. 6 is a cross sectional view showing the braking device when the spindle is moved up according to the exemplary embodiment.

As shown in FIG. 5, the knob 76 is pulled up from a state where the spindle 3 is moved down. Then, as shown in FIG. 6, the shaft 75 is moved up, and the piston 72 and the spindle 3 that are corrected with the shaft 75 are also moved up. In other words, the spindle 3 can be lifted.

When the piston 72 is moved up, the volume of the damper chamber 77 is reduced and the pressure in the damper chamber 77 is increased. Then, air within the damper chamber 77 is discharged through the clearance 78 provided between the closing member 74 and the shaft 75 while pushing up the closing member 74 along the shaft 75. Accordingly, the closing member 74 is spaced apart from the upper end surface of the cylinder 71 to provide a large clearance between the closing member 74 and the upper end surface of the cylinder 71, so that the air within the damper chamber 77 is discharged through this clearance to the outside. Consequently, a damper effect cannot be produced, so that the spindle 3 can be lifted by a small force.

[Advantage(s) of Exemplary Embodiment]

(1) Since the braking device 7 includes: the cylinder 71 mounted to the body case 2; the piston 72 that is provided on the upper end of the spindle 3 and accommodated to be reciprocably displaceable in the cylinder 71; the closing member 74 placed on the upper end of the cylinder 71 to define the damper chamber 77 between the closing member 74 and the piston 72; the shaft 75 connected to a side of the piston 72 opposite to the spindle 3 and penetrates the closing member 74; and the knob 76 provided on the distal end of the shaft 75, the braking device 7 can provide a lift mechanism for the spindle 3. Thus, the descent of the spindle 3 can be braked without impairing ease of use.

(2) Since the closing member 74 is displaceable in the axial direction of the shaft 75 and contactable to the upper end surface of the cylinder 71, when the shaft 75 is pulled up by the knob 76, the closing member 74 is displaced in the axial direction of the shaft 75 by the pressure of the damper chamber 77 to be spaced apart from the upper end surface of the cylinder 71. Thus, the large clearance is provided between the closing member 74 and the upper end surface of the cylinder 71, so that the air within the damper chamber 77 is discharged through this clearance. Consequently, the damper effect is hardly produced and therefore the spindle 3 can be lifted by a small force.

(3) Since the cap 73 is provided on the second end of the cylinder 71 to prevent the closing member 74 from being displaced beyond a predetermined distance in the axial direction of the shaft 75. Accordingly, the closing member 74 is not significantly displaced in the axial direction of the shaft 75 while the spindle 3 is lifted. Thus, when the spindle 3 is moved down for next measurement, for instance, the closing member 74 can be promptly brought into contact with the second end surface of the cylinder 71, whereby the damper effect can be readily produced.

[Explanation of Modification(s)]

The invention is not limited to the above-described embodiment, but includes modifications and improvements as long as an object of the invention can be achieved.

Though the closing member 74 is displaceable in the axial direction of the shaft 75 between the upper end surface of the cylinder 71 and the cap 73 in the exemplary embodiment, the closing member 74 is not limited thereto.

Figure 7:
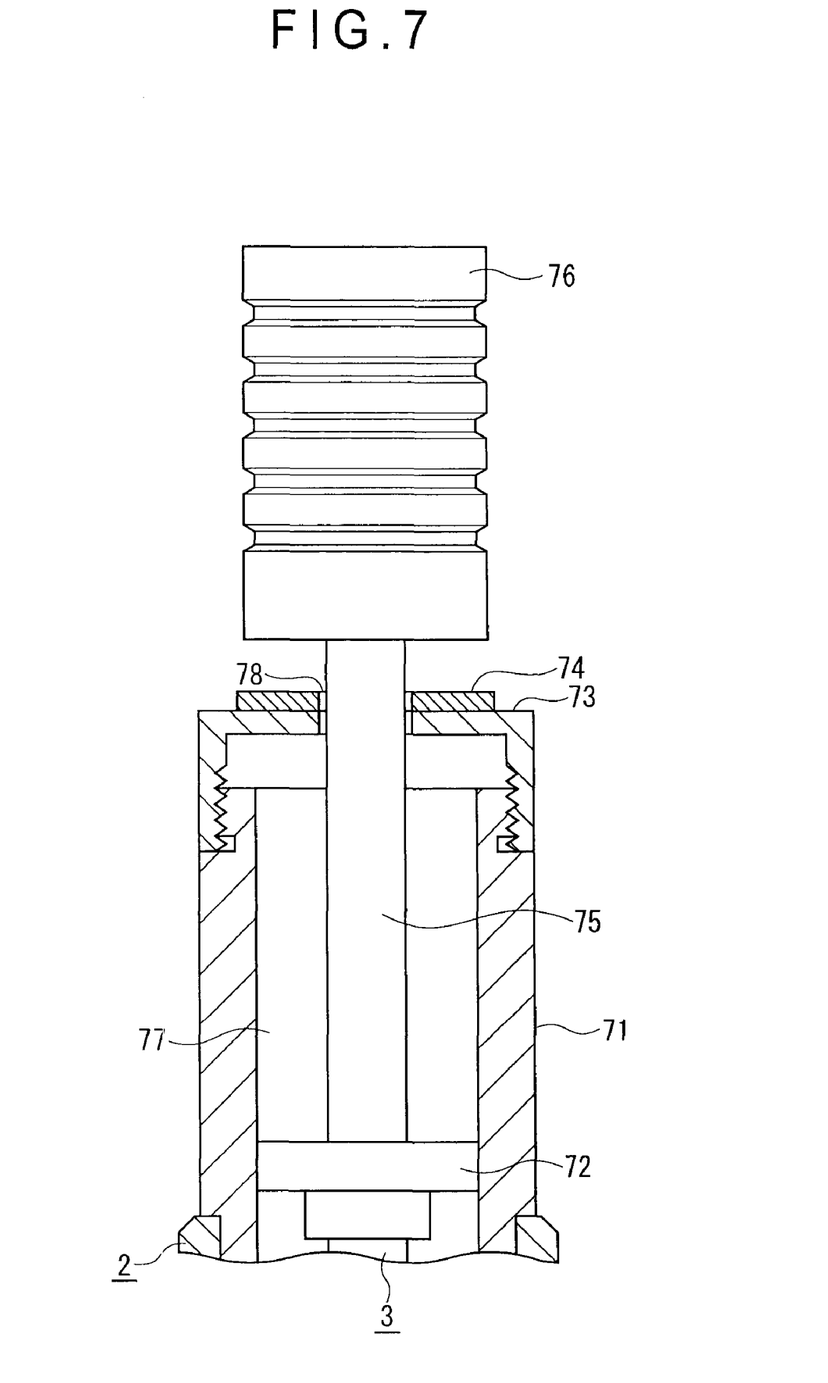
FIG. 7 is a cross sectional view showing a braking device according to a modification of the invention.

For example, as shown in FIG. 7, the closing member 74 may be displaceable in the axial direction of the shaft 75 on the external side of the cap 73, i.e., between the cap 73 and the knob 76 to attain the same advantages.

Also, the closing member 74 may not be displaceable in the axial direction of the shaft 75. The closing member 74 may be fixed to the second end surface of the cylinder 71 or fixed to the external side of the cap 73.

Though the shaft 75 including the knob 76 is integrated with the piston 72 to provide the lifting mechanism for lifting the spindle 3 by the shaft 75, the closing member 74 and the cap 73 in the exemplary embodiment, the mechanism of the invention is not limited thereto.

Figure 8:
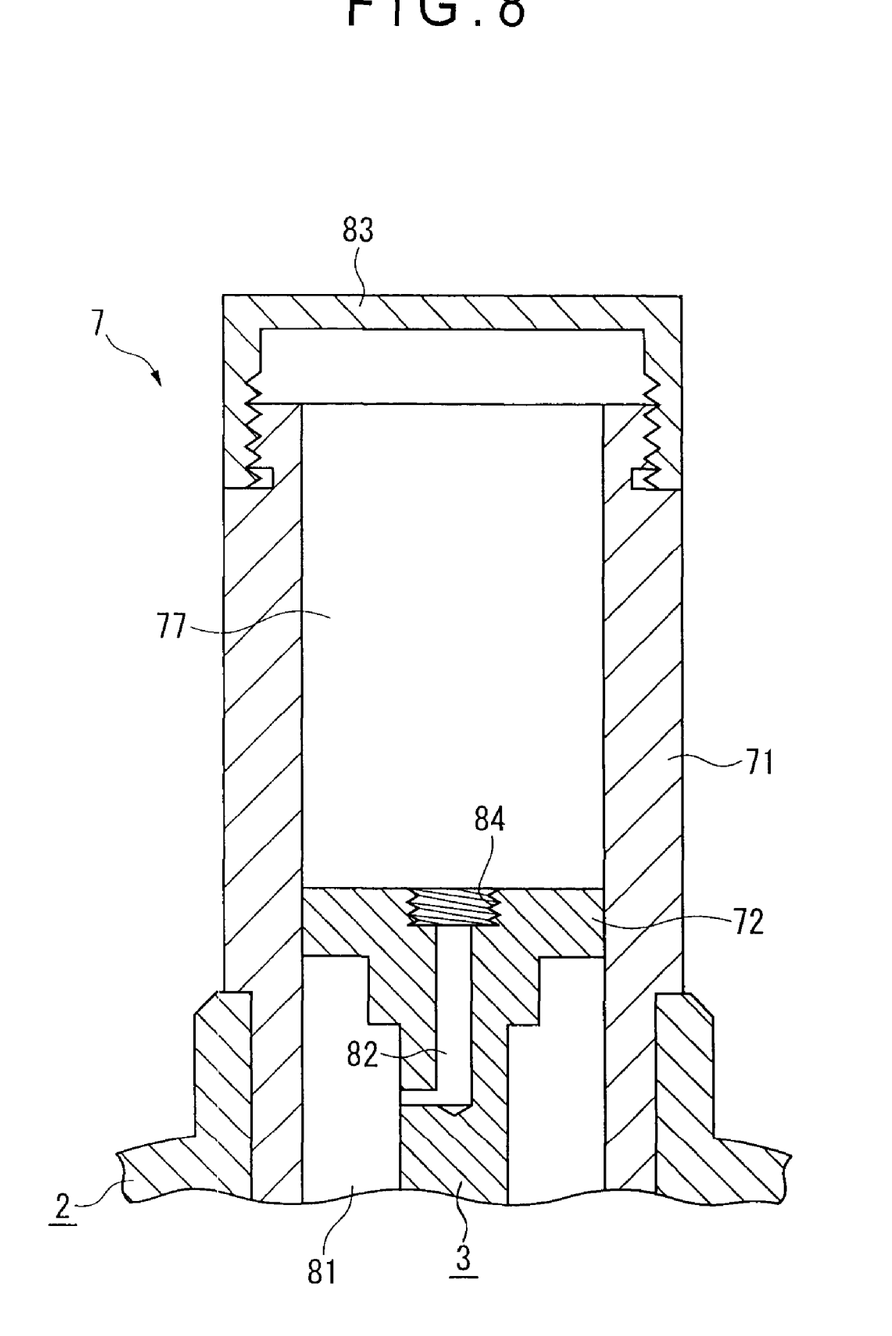
FIG. 8 is a cross sectional view showing a braking device according to another modification of the invention.

For example, as shown in FIG. 8, the shaft 75 may be detachably provided on the piston 72, and a circulating hole 82 extending from the center of the piston 72 to the outer circumference of the spindle 3 may be provided so as to gradually circulate the air between the damper chamber 77 and a chamber 81 (i.e., the chamber communicating with the accommodating space 21 of the body case 2) interposing the piston 72 therebetween. With such an arrangement, by detaching the shaft 75 from the piston 72 and covering the upper end of the cylinder 71 with a cover cap 83 or the like, only the braking device 7 can be provided without providing a lifting mechanism.

Incidentally, for providing the shaft 75 that is detachable from the piston 72, for instance, a screw hole 84 may be provided on the center of the piston 72 and an external thread 85 (see FIG. 9) screwed with the screw hole 84 may be provided on the shaft 75.

Also, the circulating hole 82 may not extend from the center of the piston 72 to the outer circumference of the spindle 3. The circulating hole 82 may penetrate both surfaces of the piston 72.

When the circulating hole 82 extends from the center of the piston 72 to the outer circumference of the spindle 3, the pressure of the damper chamber 77 is reduced by the descent of the spindle 3, thereby braking the movement of the spindle 3. At this time, the air gradually enters into the damper chamber 77, so that the spindle 3 is moved while being braked, i.e., the damper effect can be produced.

Figure 9:
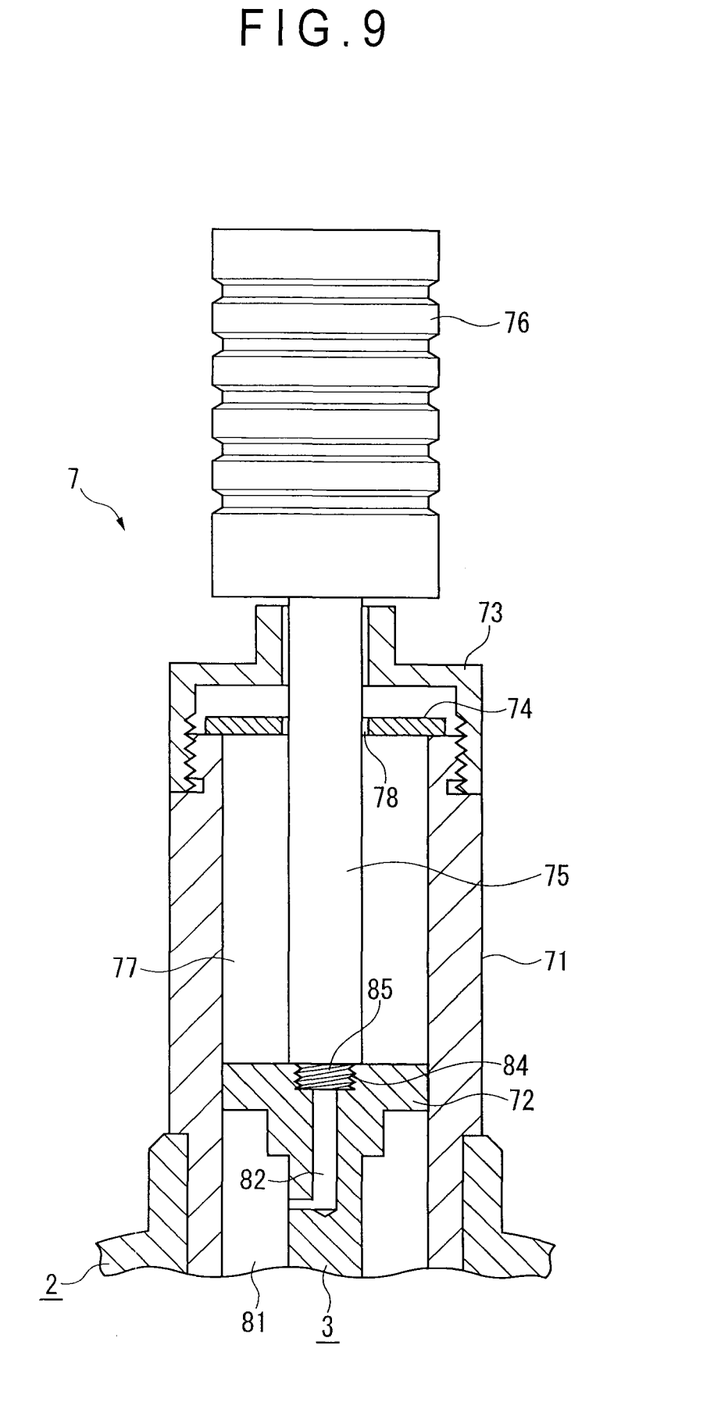
FIG. 9 is a cross sectional view showing a lift mechanism mounted to the braking device according to the another modification of the invention.

When the arrangements shown in FIG. 8 are initially employed and subsequently the shaft 75 including the knob 76 at the distal end is connected to the piston 72, the braking device can include the lifting mechanism. In other words, when the cover cap 83 is removed to provide the closing member 74 on the second end surface of the cylinder 71 while the cap 73 is screwed with the upper end of the cylinder 71 and the shaft 75 including the knob 76 at the distal end is screwed with the piston 72 as shown in FIG. 9, the braking device 7 can include the lifting mechanism afterward.

Though the lower end (the end closer to the body case 2) of the cylinder 71 is opened to communicate between the cylinder 71 and the accommodating space 21 of the body case 2 in the exemplary embodiment, the lower end of the cylinder 71 may be hermetically sealed with the bush 101 as in the braking device disclosed in JP-A-59-170701 mentioned in the background art.

The entire disclosure of Japanese Patent Application No. 2008-152804, filed Jun. 11, 2008, is expressly incorporated by reference herein.

What is claimed is:

1. A braking device of a measuring instrument comprising a body case and a spindle that penetrates the body case to be axially and reciprocably displaceable and includes a probe at a first end, the braking device comprising:
    a cylinder of which a first end is attached to a body case for accommodating a second end of a spindle;
    a piston provided on the second end of the spindle and accommodated to be reciprocably displaceable within the cylinder;
    a closing member provided on a second end of the cylinder to form a damper chamber between the piston and the closing member;
    a shaft that is opposite to the spindle by interposing the piston therebetween and penetrates the closing member; and
    an operating section provided on a distal end of the shaft, wherein
    a clearance is provided between the closing member and the shaft for circulating air between the damper chamber and an outside, and
    the closing member is displaceable in an axial direction of the shaft and contactable to a second end surface of the cylinder.

2. The braking device of the measuring instrument according to claim 1, wherein
    a cap is provided on the second end of the cylinder to cover the closing member and prevent the closing member from being displaced beyond a predetermined distance in the axial direction of the shaft.

3. The braking device of the measuring instrument according to claim 1, wherein
    the shaft is detachable from the piston, and
    a circulating hole is provided on the piston or on both of the piston and the spindle to communicate between the damper chamber and a chamber opposite to the damper chamber by interposing the piston therebetween for circulating air.

4. A measuring device comprising:
    a body case;
    a spindle that penetrates the body case to be axially and reciprocably displaceable and includes a probe at a first end;
    a biasing unit that biases the spindle toward the first end; and
    the braking device according to claim 1.

5. A measuring device comprising:
    a body case;
    a spindle that penetrates the body case to be axially and reciprocably displaceable and includes a probe at a first end;
    a biasing unit that biases the spindle toward the first end; and
    the braking device according to claim 3.

* * * * *